US005748727A

United States Patent [19]
Lundell et al.

[11] Patent Number: 5,748,727
[45] Date of Patent: May 5, 1998

[54] CORDLESS TELEPHONE APPARATUS SWITCHABLE BETWEEN DESKTOP AND WALL MOUNT

[75] Inventors: Louis J. Lundell, Buffalo Grove; Sang Y. Oh, Schaumburg; Terron C. Newman, Country Club Hills, all of Ill.

[73] Assignee: Motorola, Inc., Schaumburg, Ill.

[21] Appl. No.: 970,965

[22] Filed: Nov. 4, 1997

Related U.S. Application Data

[63] Continuation of Ser. No. 645,379, May 13, 1996, abandoned.

[51] Int. Cl.$^6$ .................................................. H04M 1/00
[52] U.S. Cl. ........................... 379/446; 379/455; 379/435; 379/436
[58] Field of Search .................................. 379/454, 455, 379/426, 449, 446, 433, 435, 436, 428; 455/90, 575, 347, 348

[56] References Cited

U.S. PATENT DOCUMENTS

| 4,710,596 | 12/1987 | Kurokawa | 379/435 |
| 5,087,004 | 2/1992 | Lundell et al. | 248/126 |
| 5,151,643 | 9/1992 | Emmert et al. | 320/2 |
| 5,305,381 | 4/1994 | Wang et al. | 379/454 |
| 5,471,653 | 11/1995 | Nagai | 379/433 |
| 5,519,776 | 5/1996 | Kodama | 379/435 |

FOREIGN PATENT DOCUMENTS

| 585011 | 2/1994 | European Pat. Off. | 379/454 |

*Primary Examiner*—Jack Chiang
*Attorney, Agent, or Firm*—John G. Rauch

[57] ABSTRACT

A telephone apparatus (100) includes a base (102) and a handset (104) configurable in a desktop mode and a wall mount mode. Spring loaded detents (132, 134) in the base (102) engage recesses in the handset (104) in wall mount mode to securely retain the handset (104) in a pocket (101) in the base. The base includes a switchable detent mechanism (170) for retracting the detents (132, 134) in response to an actuator (150) when the base (102) is switched from wall mount mode to desktop mode. Thus, the detents (132, 134) do not interfere with the handset (104) when the handset (104) is placed in or withdrawn from the pocket (101).

10 Claims, 9 Drawing Sheets

CORDLESS TELEPHONE APPARATUS SWITCHABLE BETWEEN DESKTOP AND WALL MOUNT

This is a continuation of application Ser. No. 08/645,379, filed May 13, 1996 and now abandoned.

FIELD OF THE INVENTION

The present invention relates generally to a cordless telephone base. The present invention relates more specifically to a cordless telephone base usable in both desktop and wall mount applications.

BACKGROUND OF THE INVENTION

Cordless telephones generally include a portable handset and a stationary base. The base may be coupled to a telephone line for wireline communication with the public switched telephone network (PSTN). The base thus includes circuitry necessary for placing and receiving telephone calls with the PSTN. The base and handset each includes a transceiver section for radio communication over a radio link. The handset further includes a user interface, including a keypad, an earpiece and a microphone. The base may include a similar user interface. By operating the user interface of the handset, a user may conduct a telephone call over the radio link to the base and the PSTN.

Portability of the handset enhances convenience for the user. The user is free to move about anywhere within the range of the radio link during a call. The user may answer an incoming call or place an outgoing call remotely from the base station. The handset is powered by one or more batteries for extended talk time. To further increase user convenience, the batteries may be rechargeable. The base typically includes a housing molded to define a pocket sized to receive the handset. To permit use of rechargeable batteries, the pocket includes one or more charging contacts. Battery powered, cordless operation increases the user's options for use of the telephone.

Cordless bases have been developed which also provide configuration options for the user. For example, some users prefer locating the base on a horizontal surface of a desk, table, kitchen counter or other area (hereinafter referred to as "desktop" mode or configuration). Other users prefer locating the base on a wall or other vertical surface (hereinafter referred to as "wall mount" mode or configuration). In order to satisfy the requirements of both of these types of users by providing a single base to all users, manufacturers have developed switchable bases which may be selectively configured for either desktop or wall mount. Such a switchable base may be manufactured at lower manufacturing cost than desktop-only or wall mount-only bases. In the area of consumer goods such as cordless telephones, minimizing product cost is a critical design goal. Such switchable bases also permit changing a base's location between desktop and wall mount as the user's needs change.

When a base is located on a desktop, the base is preferably tilted at an angle, with the front or top surface angled toward the user. This angle permits better viewing of the base, including viewing and operation of a keypad in the base and viewing a display in the base. The angle further permits the handset to be picked up by pulling the handset toward the user while lifting, a more ergonomically accommodating motion. The angle is sufficiently shallow so that the handset remains in the pocket merely by force of gravity.

When a base is wall mounted, the base is preferably maintained straight, rather than angled, with the front surface substantially parallel to the wall. Such an orientation also permits better viewing of the base including the keypad and display. In this orientation, however, the handset may have a tendency to fall out of the pocket unless the handset it mechanically retained in the pocket. The tendency may be exacerbated in applications where the base is wall mounted near a door that is slammed shut, jarring the base and handset, or where the base is wall mounted in a location where the base or handset may be bumped or jostled by passing users.

Different types of retainers have been developed for retaining a handset in the base pocket for wall mount applications. In one category, fixed or snap-on protruding arms are included in the base. The arms grab the handset body at the earpiece end or the top of the handset. Due to this grabbing action, the handset is retained in the pocket. In a second category, the base includes a fixed protrusion such as a hook and the handset includes a slot. The protrusion engages the slot located on the face of the handset, near the keypad or earpiece, to retain the handset in the pocket. In a third category, the base includes aligned, opposing, spring loaded posts which engage slots on the handset. Typically these posts also include the charging contacts of the battery charger.

One problem associated with all of these retainers is the interference with use of the handset occurring when the base is changed from wall mount to desktop. The arms or protrusions or posts which are needed to engage and retain the handset in the pocket in wall mount mode are not needed in desk top mode. On a desk top, such retainers tend to interfere with removing the handset from the pocket when lifting the handset to place or answer a call. The effect of this interference is to require the user to use two hands to separate the handset and base, or to use excessive force to lift the handset from the base, or to use an awkward motion, rotating the wrist upwardly and outwardly while lifting the handset. Similarly, large force is required to overcome the resistance of the retainers when returning the phone to the pocket after completion of a call. Such interference is inconvenient and unacceptable to many users.

Another problem associated with these retainers is their impact on the cosmetic appearance of both the handset and the base. Current cordless phone systems are designed to be visually appealing and to create an attractive appearance suitable for use in a home or on a desk. Protrusions such as arms or hooks on the base can ruin the carefully designed appearance of the base. Similarly, slots or other apertures on the face of the handset can mar the finished appearance of the handset.

Accordingly, there is a need in the art for a cordless telephone base capable of conversion between desktop and wall mount configuration. There is a further need for a cordless telephone base having very little or no resistance to the handset in desktop mode, but with secure retention of the handset in wall mount mode.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
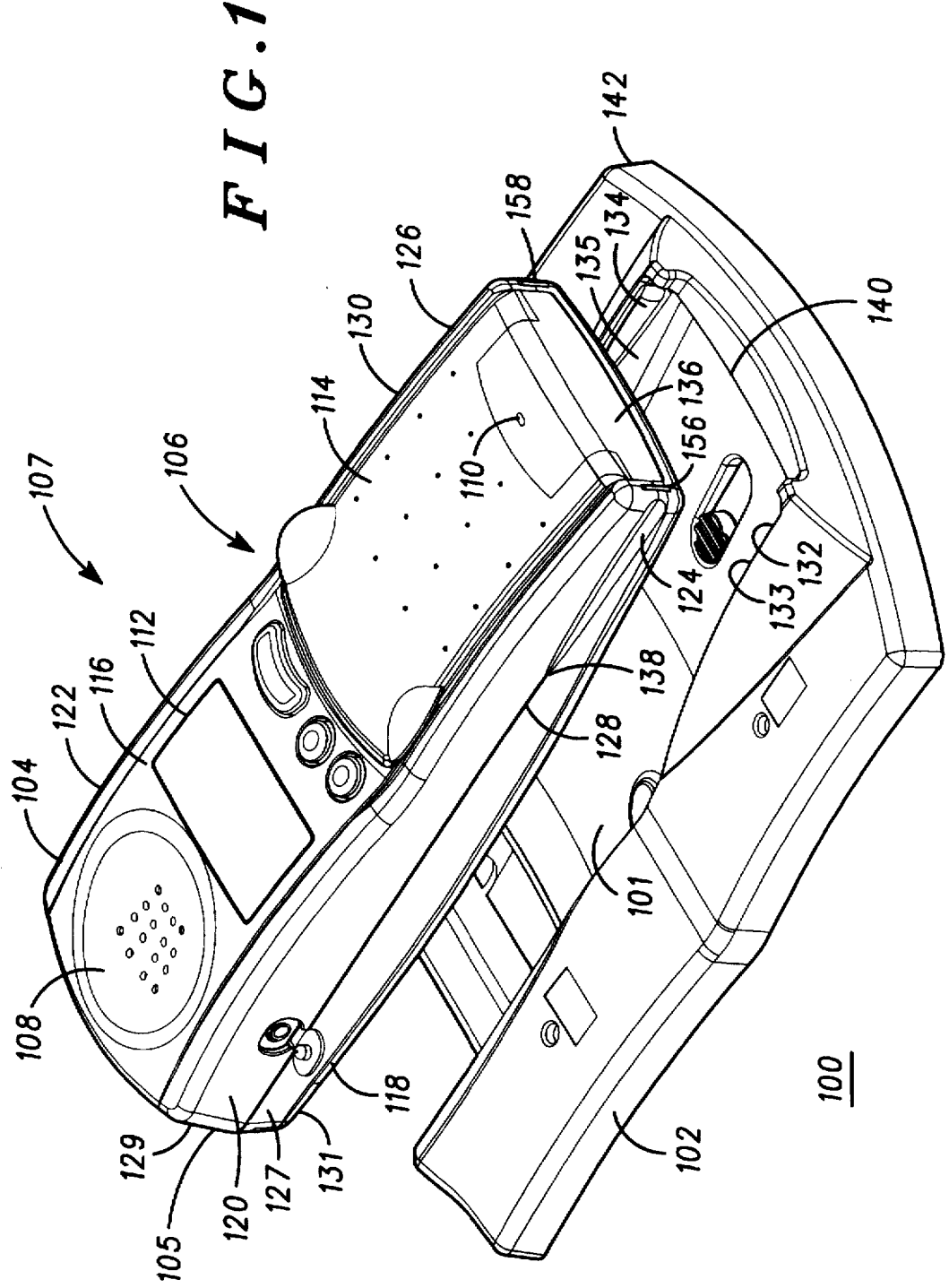
FIG. 1 is a top isometric view of a cordless telephone system with which the present invention may be used.

Referring now to FIG. 1, a telephone apparatus 100 includes a base 102 and a handset 104. The base 102 includes a pocket 101 sized to receive the handset 104. Only a portion of the base 102, housing 142, is illustrated in FIG. 1. A completed assembly would include a lower housing which mates to the housing 142.

The telephone apparatus 100 may be, for example, a cordless telephone wherein the base 102 is a cordless base configured for coupling to a telephone network and the handset 104 is a cordless handset configured for wireless communication with the base 102. In such an application, the base 102 includes circuitry necessary for placing and receiving telephone calls with the telephone network. The base 102 and the handset 104 each includes a transceiver section for radio communication over a radio link.

The handset 104 is battery powered and portable by a user. The handset 104 includes a housing 105 and a user interface 107. The user interface 107 includes a keypad 106, an earpiece 108, a microphone 110 and a display 112. In FIG. 1, a portion of the keypad 106 is covered by a keypad cover 114. By operating the user interface 107 of the handset 104, a user may conduct a telephone call over the radio link with the base station and the telephone network.

The handset 104 generally has a face 116, a back 118, a first side 120 and a second side 122. The housing 105 defines one or more recesses 124, 126. As will be described in detail below, the base 102 includes one or more detents, each detent engaging a respective recess when the handset 104 is placed in the pocket in wall mount mode. Each detent includes a lobe. In wall mount mode, the lobes engage the recesses to retain the handset in the pocket 101.

Preferably, the first side 120 defines a first recess 124 and the second side 122 defines a second recess 126 which is not visible in FIG. 1. The base includes a first detent 132 disposed on a first side wall 133 of the pocket 101 and not visible in FIG. 1, and a second detent 134 disposed on a second side wall 135 of the pocket 101. Further, the first recess 124 is defined along a centerline 128 of the first side 120 of the handset 104 and the second recess 126 is defined along a centerline 130 of the second side 122 of the handset 104. The recesses 124, 126 may be located along a seam 127 defined by assembly of a front housing 129 and a rear housing 131 of the handset 104. By locating the recesses along the centerline 128 or seam 127 of the handset 104, the handset may be placed in the pocket 101 with either the face 116 of the handset 104 or the back 118 of the handset 104 proximate the base 102. That is, the first detent 132 engages one of the first recess 124 and the second recess 126 and the second detent 134 engages the other of the first recess 124 and the second recess 126 when the handset 104 is in the pocket 101. Locating the recesses 124, 126 along the seam 127 minimizes the marring of the appearance and helps to create a sculptured, finished appearance for the handset 104.

The one or more recesses are positioned proximate a lower edge 136 of the handset 104 and tapered from the lower edge 136. That is, the recesses are relatively wide where they meet the lower edge 136 and narrow or taper to a point, such as point 138 of first recess 124. Similarly, the detents 132, 134 are positioned proximate the lower extent 140 of the pocket 101 and tapered conformably with the one or more recesses. That is, the detents 132, 134 are narrowed to a point shaped to conform to point 138 and widen as they approach the lower extent 140 of the pocket 101. In this manner, when the handset 104 is returned to the pocket, either in desktop or wall mount mode, the wide ends of the recesses easily receive the narrow pointed ends of the detents and guide the handset 104 to its proper location in the pocket. Further, locating the recesses near the lower edge 136 of the handset 104 does not detract from the appearance of the handset 104. Rather, the recesses are relatively unobtrusive. Moreover, the long, slender shape of the recesses is more visually appealing than many other shapes.

Figure 2:
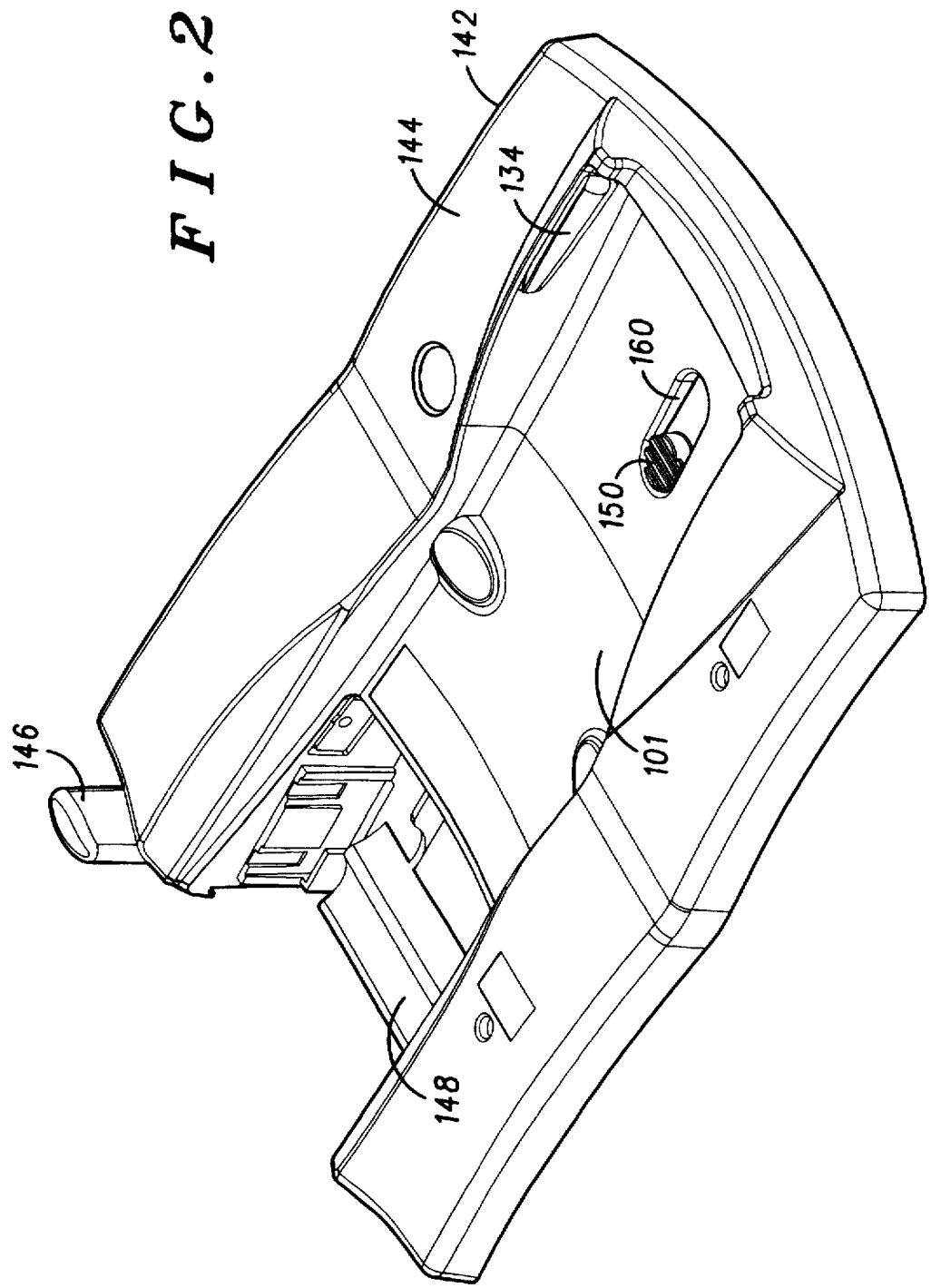
FIG. 2 is a top isometric view of the cordless telephone base of the cordless telephone system of FIG. 1.
Figure 3:
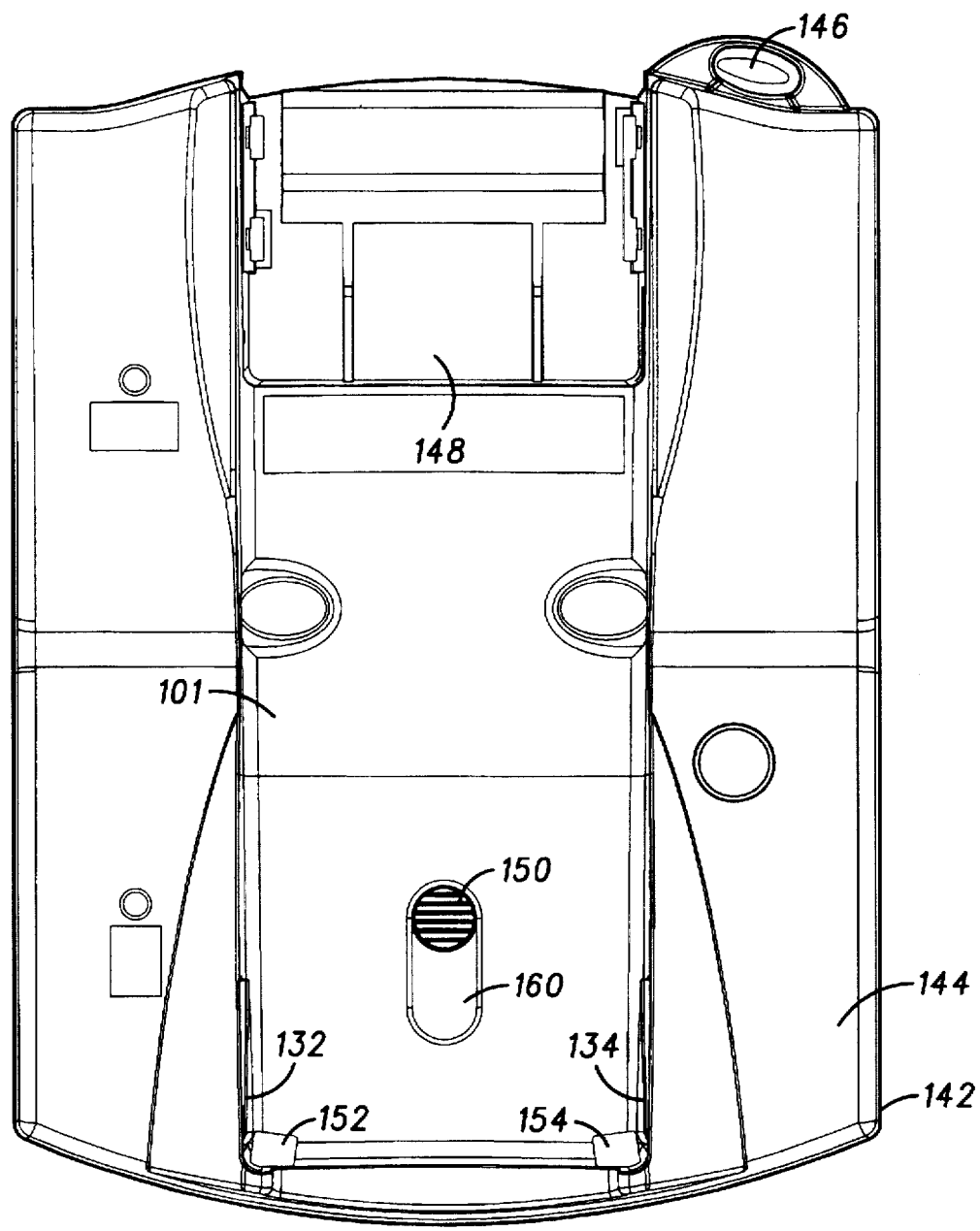
FIG. 3 is a top view of the cordless telephone base of FIG. 2 in a first configuration.
Figure 4:
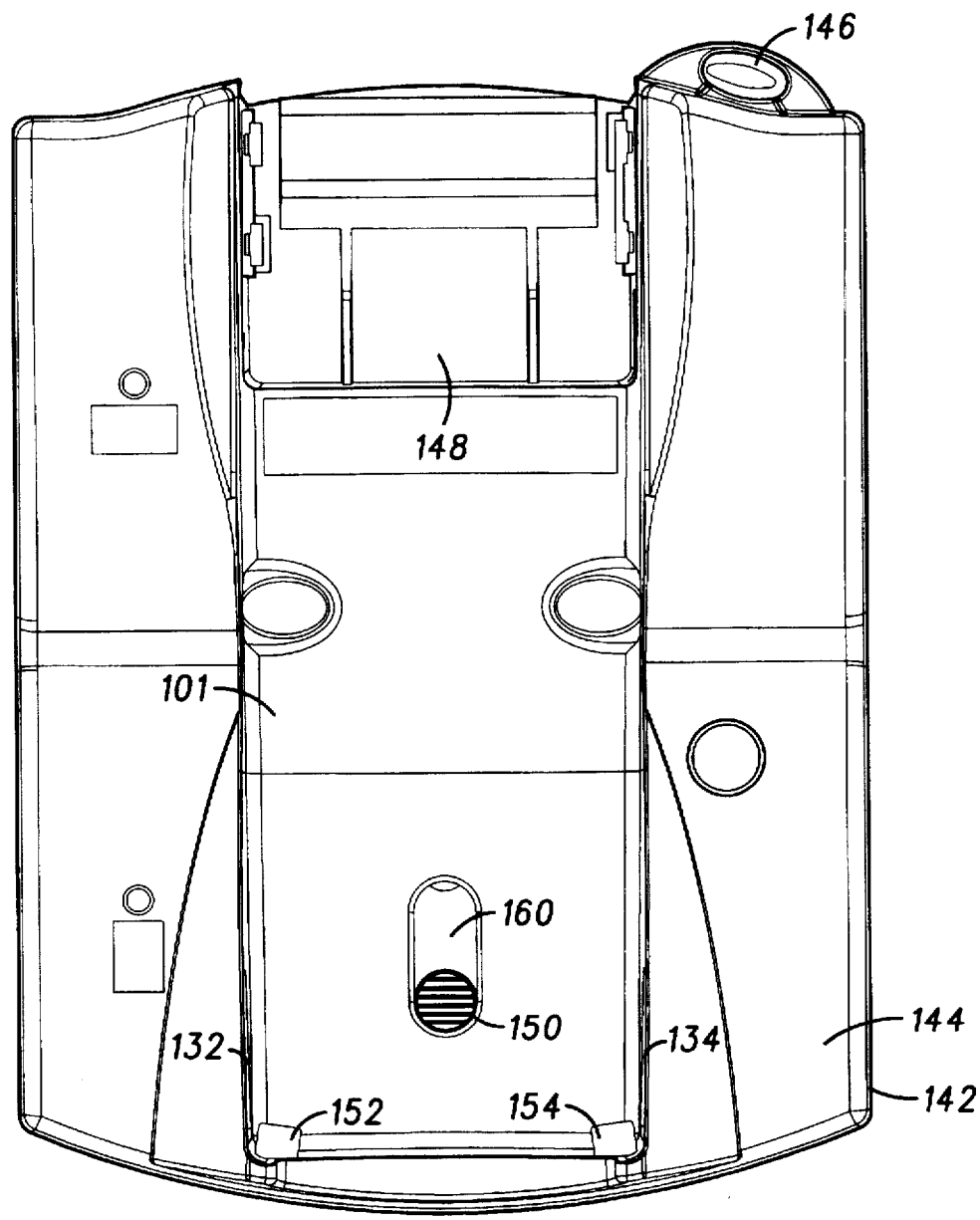
FIG. 4 is a top view of the cordless telephone base of FIG. 1 in a second configuration.
Figure 5:
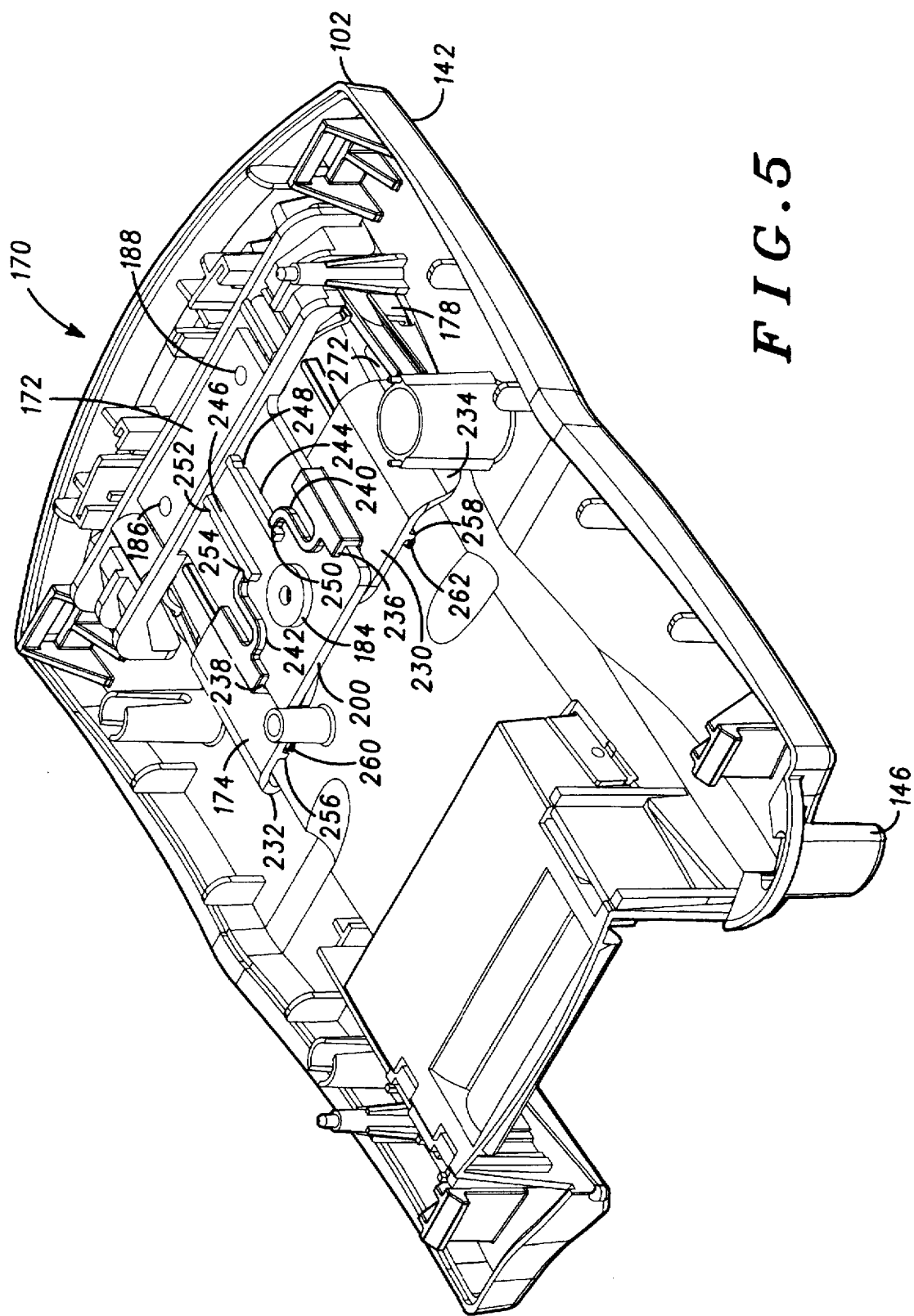
FIG. 5 is a bottom isometric view of a top housing of the cordless telephone base of FIG. 2.
Figure 6:
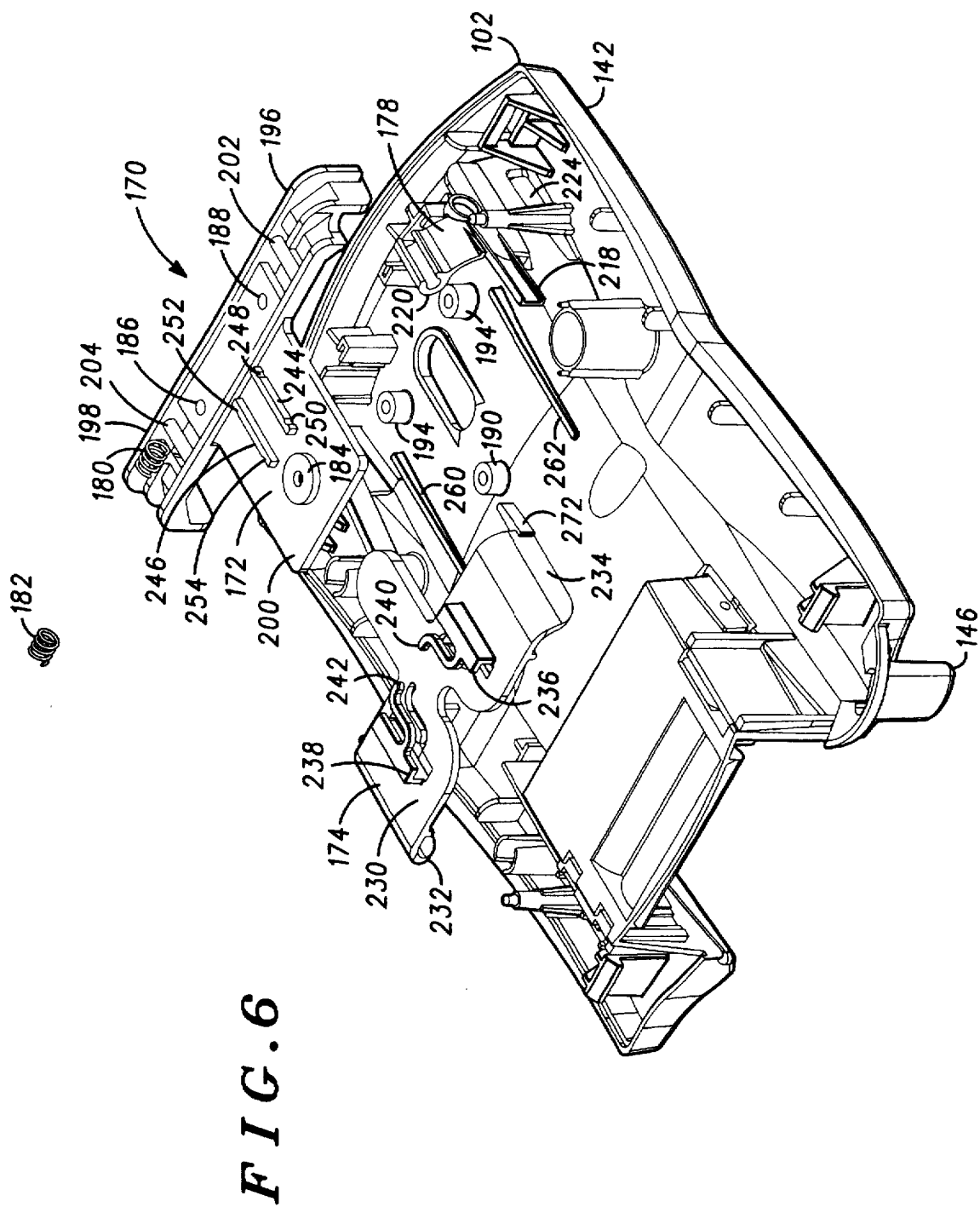
FIG. 6 is an exploded view of the top housing of FIG. 5.
Figure 7:
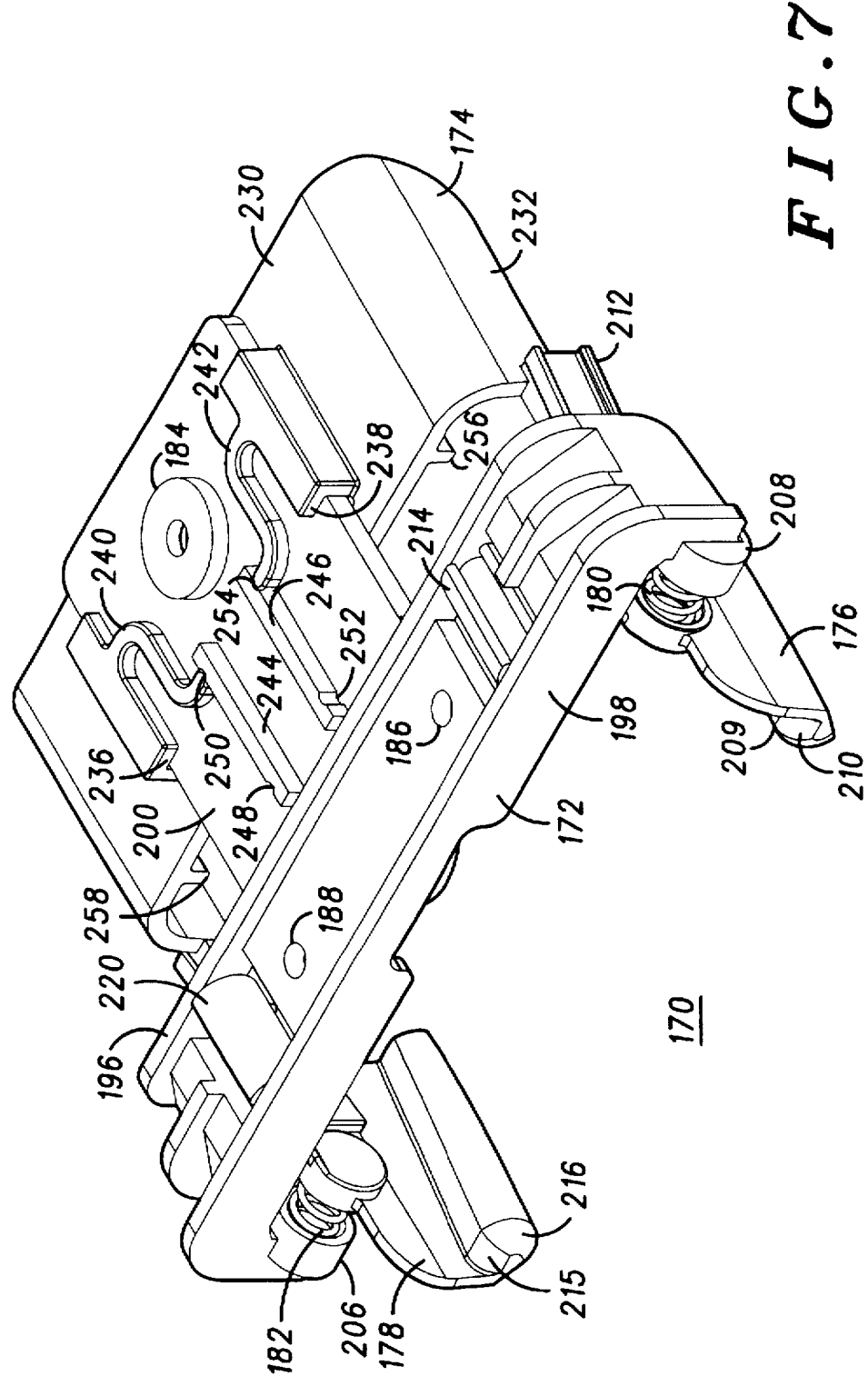
FIG. 7 is a top isometric view of a switchable detent mechanism for use with the cordless telephone base of FIG. 2.

Referring to FIGS. 2–4, the base 102 includes a housing 142 having a top surface 144 defining the pocket 101. Preferably, the housing 142 is made of plastic molded to define the pocket 101. In addition, the housing 142 is molded to define an antenna housing 146 and a spare battery compartment 148. The housing 142 further includes a movable actuator 150 and charging contacts 152, 154. The spare battery compartment is sized to retain one or more spare batteries for the handset 104. The charging contacts engage similar charging contacts 156, 158 on the handset (FIG. 1) for recharging the battery which powers the handset 104 when the handset is in the pocket 101.

In accordance with the present invention, the first detent 132 and second detent 134 are movable between a first or wall position, illustrated in FIG. 3, for wall mount mode and a second or desk position, illustrated in FIG. 4, for desktop mode in response to the actuator 150. The detents 132, 134 securely retain the handset 104 in the pocket when in the first position. The top surface 144 of the housing 142 defines an aperture 160. The aperture 160 exposes the actuator 150 for manually moving the actuator 150. When the actuator 150 is moved to a first or wall position, illustrated in FIG. 2, the detents are in the first or wall position for wall mount mode. When the actuator is moved to a second or desk position, illustrated in FIG. 3, the detents are in the second or desk position for desktop mode. The actuator 150 has a ribbed surface for easy engagement by a finger of the user for moving the actuator 150 between the wall and desk positions. While the actuator is illustrated in the drawing figures as accessible through the top surface of the housing 142, the actuator 150 may be located in any convenient location on the base 102.

According to the present invention, the detents include opposing, spring-loaded lobes within the pocket 101. The detents include a first detent 132 and a second detent 134. Further description of the structure and operation of the detents will be provided below in conjunction with FIGS. 5–9. The detents are positioned in wall mount mode to engage the handset 104 with a spring force for retaining the handset 104 in the pocket. The spring force is reduced in desktop mode to permit easy removal of the handset 104 from the pocket 101. In desktop mode, the user lifts the handset 104 slightly and draws the handset 104 toward the user. The user returns the handset 104 to the pocket 101 using an opposite motion, generally placing the handset 104 in the pocket 101 in a vertical direction (i.e., into the page in FIGS. 2 and 3). Therefore, according to a first aspect of the present invention, in desktop mode, the detents are retracted from the handset 104 so as not to interfere with the handset 104 upon removal of the handset 104 from the pocket 101 and return of the handset 104 to the pocket 101. According to a second aspect of the invention, in desktop mode the spring force on the detents is lessened. By lessening the spring force on the detents 132, 134, the handset may be easily removed from and returned to the pocket 101, as the detents deflect out of the way of the handset 104.

Referring now to FIGS. 5–9, the base 102 further comprises a switchable detent mechanism 170 disposed within the base 102. The switchable detent mechanism 170 includes a bridge 172, a slider 174, a first detent body 176, a second detent body 178, a first spring 180 and a second spring 182. The bridge 172, the slider 174, the first detent body 176 and the second detent body 178 are preferably molded from plastic or other suitable material.

The bridge 172 includes a first arm 196 and a second arm 198 extending from a tongue 200. The bridge 172 further includes mounting fixtures 184, 186, 188 defined by the tongue 200 by which the bridge 172 may be fixed to the housing 142. The housing 142 includes bosses 190, 192, 194 to which the mounting fixture 184 may be attached, by a screw, adhesive or any other suitable means. The first arm 196 includes a first pin 202 and the second arm includes a second pin 204. The first arm 196 further includes a first spring mount 206 for retaining spring 182. Similarly, the second arm 198 further includes a second spring mount 208 for retaining the spring 180.

The first detent body 176 includes a detent 209 having a lobe 210, a deflection arm 212 and a fork 214. The second detent body 178 includes a detent 215 having a lobe 216, a deflection arm 218 and a fork 220. The fork 214 is sized to receive the pin 204, the pin 204 snap fitting into the fork 214 so that, when the switchable detent mechanism 170 is assembled, the pin 204 is journalled in the fork 214. Similarly, the fork 220 is sized to receive the pin 202 so that, when the switchable detent mechanism 170 is assembled, the pin 202 is journalled in the fork 220. The housing 142 includes an aperture 224 (FIG. 6) through which the lobe 216 may be extended by operation of the switchable detent mechanism 170. The housing 142 includes a similar aperture through which the lobe 210 may be extended.

The slider 174 includes a body 230 and one or more bias members such as first bias member 232 and second bias member 234. The actuator 150 is disposed on the body 230. The slider 174 further includes a first lip 236 and a second lip 238. When the switchable detent mechanism 170 is assembled, the first lip 236 and the second lip 238 receive the tongue 200 of the bridge 172 so that the slider 174 slidably engages the bridge 172 for movement between a first or wall position and a second or desk position.

The slider 174 further includes a flexible arm 240 and a flexible arm 242. The bridge includes a rib 244 and a rib 246, rib 244 having notches 248 and 250 and rib 246 having notches 252 and 254. When the switchable detent mechanism 170 is assembled, the flexible arm 240 engages the rib 244 and the flexible arm 242 engages the rib 246. When the slider is in the first or wall position, the end of the flexible arm 240 engages the notch 248 and the end of the flexible arm 242 engages the notch 252. The bias force provided by the flexibility of the flexible arms 240, 242 retains the respective ends of the flexible arms 240, 242 in the respective notches 248, 252. When the slider is in the second or desk position, the end of the flexible arm 240 engages the notch 250 and the end of the flexible arm 242 engages the notch 254. The bias force provided by the flexibility of the flexible arms 240, 242 retains the respective ends of the flexible arms 240, 242 in the respective notches 250, 254. The action of the flexible arms 240, 242 engaging the notches 248, 250, 252, 254 keeps the slider 174 in the selected first position or second position. To prevent the slider 174 from twisting when moving between positions, the slider 174 includes a rib 256 and a rib 258 which engage a rib 260 and a rib 262, respectively, on the housing 142.

When the slider 174 is in the first or wall position, the first bias member 232 does not engage, or only lightly engages, the deflection arm 212 of the first detent body 176. Similarly, the second bias member 234 does not engage or only lightly engages the deflection arm 218 of the second detent body 178. The first spring 180 exerts a bias force or spring force on the first detent body 176, causing the fork 214 to pivot about the pin 204, deflecting the first detent body 176 outwardly and extending the detent 209 including the lobe 210 through the aperture in the housing 142. In the same manner, the second spring 182 exerts a bias force or spring force on the second detent body 178, pivoting the fork 220 about the pin 202 and deflecting the second detent body 178 outwardly, extending the detent 215 including the lobe 216 through the aperture 224 in the housing 142. As noted above in connection with FIG. 1, the lobes 210, 216 are preferably shaped to conform to recesses 124, 126 on the handset 104 to retain the handset 104 in the pocket 101 in wall mount mode.

When the base is changed from wall mount mode to desktop mode, the actuator 150 manually moves the slider 174 from the first position to the second or desk position. As the slider 174 moves from the first position to the second position, the first bias member 232 engages the deflection arm 212 of the first detent body 176. Similarly, the second bias member 234 engages the deflection arm 218 of the second detent body 178. The bias members 232, 234 deflect the deflection arms 212, 218 outward. As the deflection arms 212, 218 are deflected, the detents 209, 215 are retracted through the apertures in the housing 142, including aperture 224. Thus, each of the bias members 232, 234 engages a respective detent to move the detent from the first or wall position to the second or desk position.

Figure 8:
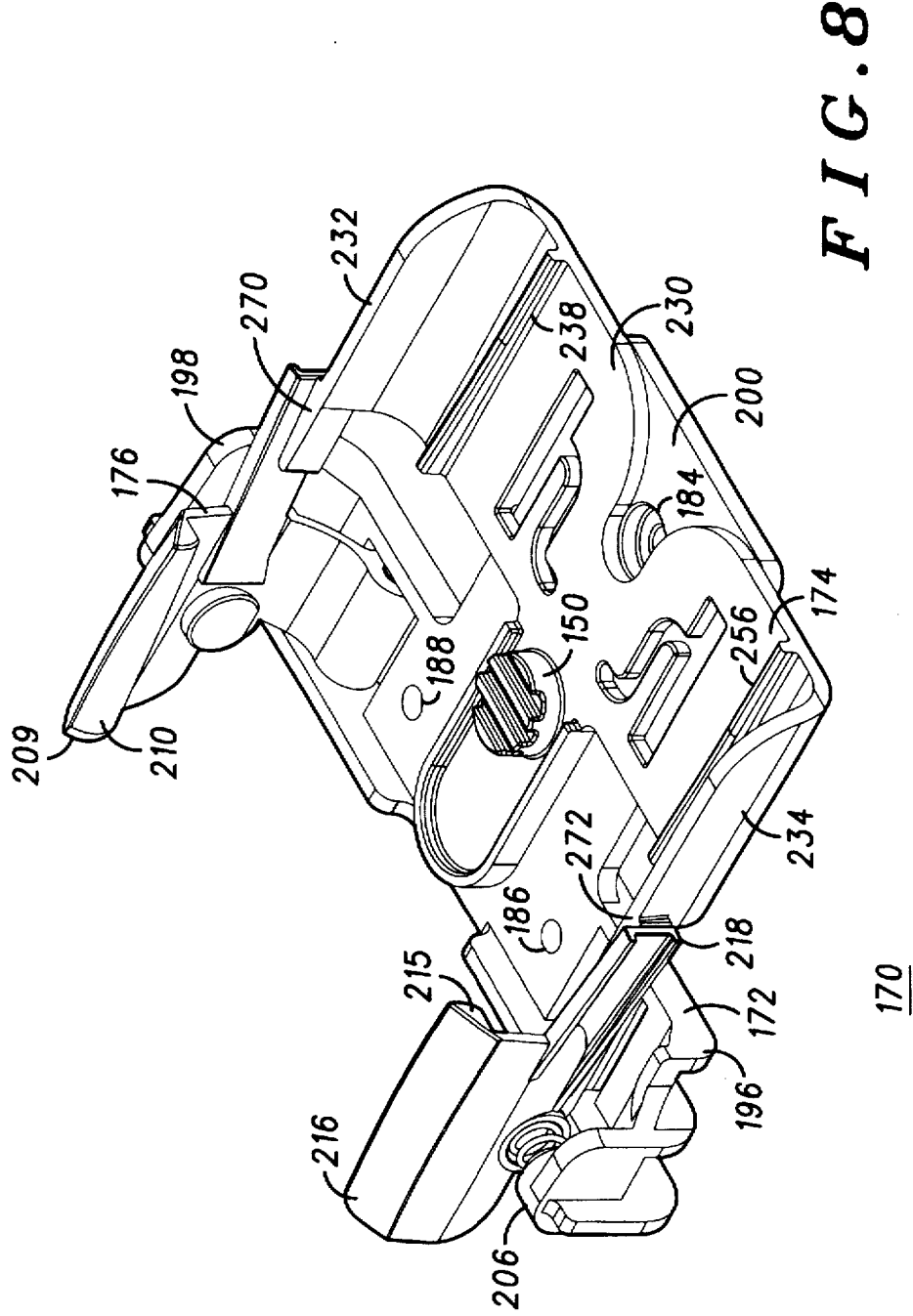
FIG. 8 is a bottom isometric view of the switchable detent mechanism of FIG. 7.
Figure 9:
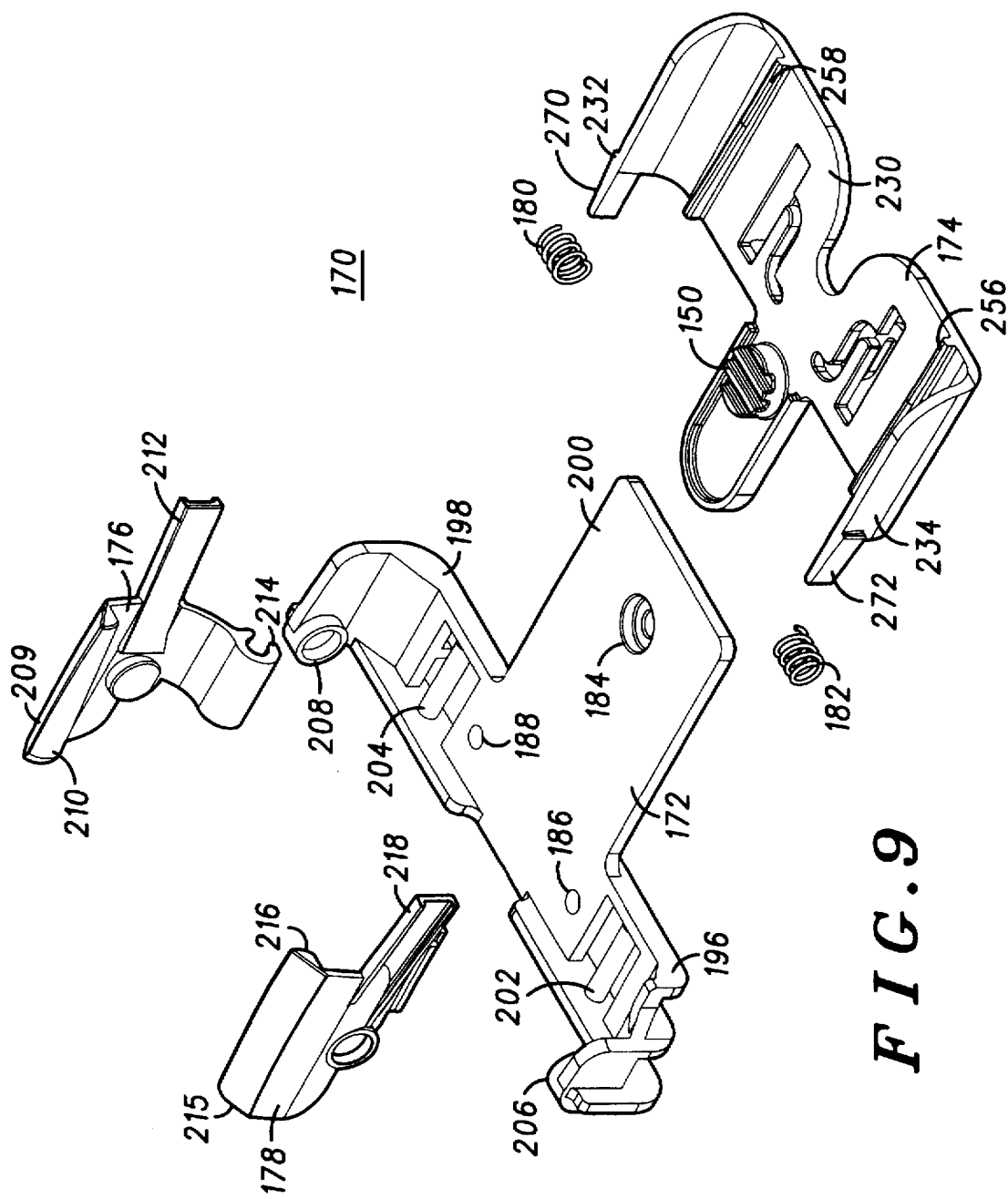
FIG. 9 is an exploded view of the switchable detent mechanism of FIG. 8.

Preferably, each bias member 232, 234 exerts an increasing force on the respective detent as the slider 174 is moved from the first position to the second position. As is illustrated in FIGS. 8–9, the bias members comprise wedge shaped extension for exerting a force in opposition to the spring force when the slider 174 is moved from the first position to the second position. First bias member 232 has a wedge shaped extension 270 and second bias member 234 has a wedge shaped extension 272. When the bias members 232, 234 engage the respective deflection arms, the wedge shapes exert an increasing force on the respective deflection arm or detent as the slider is moved from the first position to the second position. This force retracts the detents and the lobes as the slider is moved. Alternatively, the bias members 232, 234 may operate to reduce the spring force exerted on the detents and lobes so that, as the handset is withdrawn from and replaced in the pocket, the detents easily deflect without interfering with the handset.

As can be seen from the foregoing, the present invention provides a telephone apparatus including a base and handset configurable in a desktop mode and a wall mount mode. Spring loaded lobes in the base engage recesses in the handset in wall mount mode to securely retain the handset in a pocket in the base. The base includes a switchable detent mechanism for retracting the lobes in response to an actuator when the base is switched from wall mount mode to desktop mode. Thus, the lobes do not interfere with the handset when the handset is placed in or withdrawn from the pocket. This convenient feature is provided without including unsightly hooks or slots on the face of the handset which would mar the finished appearance of the handset.

While a particular embodiment of the present invention has been shown and described, modifications may be made. It is therefore intended in the appended claims to cover all such changes and modifications which fall within the true spirit and scope of the invention.

What is claimed is:

1. A telephone apparatus comprising:

a handset having a face and a back and a first side and a second side, the first side defining a first recess and the second side defining a second recess;

a base convertible between a vertical arrangement and a horizontal arrangement, the base being disposed on a substantially vertical surface in the vertical arrangement and being disposed on a substantially horizontal surface in the horizontal arrangement, the base including:

a housing molded to define a pocket, the pocket being sized to receive the handset;

a movable actuator having a first actuator position corresponding to the vertical arrangement and a second actuator position corresponding to the horizontal arrangement; and a first detent disposed on a first side wall of the pocket and a second detent disposed on a second side wall of the pocket, the first detent and the second detent movable between a first configuration for the vertical arrangement and a second configuration for the horizontal arrangement in response to movement of the movable actuator between the first actuator position and the second actuator position, the first detent and the second detent in the first configuration engaging the handset to removably retain the handset in the pocket for the vertical arrangement, the first detent and the second detent in the second configuration disengaging the handset so that the detents do not interfere with the handset when the handset is withdrawn from the pocket in the horizontal arrangement, the first detent engaging one of the first recess and the second recess and the second detent engaging the other of the first recess and the second recess when the handset is stored in the pocket so that the handset may be stored in the pocket with either the face or the back proximate the base.

2. A telephone apparatus as recited in claim 1 further comprising:

one or more bias members, each of the one or more bias members biasing a respective detent of the first detent and the second detent in the second position; and a switchable detent mechanism disposed within the base, the switchable detent mechanism including a slider moveable between a first position and a second position, the slider including the movable actuator and the one or more bias members, each of the one or more bias members engaging a respective detent of the first detent and the second detent to retract the respective detent from an extended position to a retracted position.

3. A telephone apparatus as recited in claim 2 wherein each bias member is wedge shaped to exert an increasing force on the respective detent as the slider is moved from the first position to the second position.

4. A telephone apparatus as recited in claim 2 wherein the switchable detent mechanism further comprises a bridge fixed to the housing and wherein the slider slidably engages the bridge for movement between the first position and the second position.

5. A telephone apparatus as recited in claim 4 wherein the housing has a top surface defining an aperture, the aperture exposing the movable actuator for manually moving the movable actuator.

6. A telephone apparatus as recited in claim 1 wherein the first recess and the second recess are positioned proximate a lower edge of the handset and tapered from the lower edge, and wherein first detent and the second detent are positioned proximate a lower extent of the pocket and tapered conformably with the first recess and the second recess.

7. A telephone apparatus as recited in claim 1 wherein the handset is a cordless handset configured for wireless communication with the base.

8. A telephone apparatus as recited in claim 1 wherein the first detent and the second detent disengage the handset in the second configuration so that the handset may be withdrawn from the pocket by grasping only the handset.

9. A telephone apparatus comprising:

a base including a housing defining a pocket, a first detent disposed on a first sidewall of the pocket and a second detent disposed on a second sidewall of the pocket; and a handset storable in the pocket, the handset including a first side and a second side, a face and a back, the first side defining a first recess, the second side defining a second recess, the first detent engaging one of the first recess and the second recess and the second detent engaging the other of the first recess and the second recess when the handset is stored in the pocket so that the handset may be stored in the pocket with either the face or the back proximate the base.

10. A telephone apparatus as recited in claim 9 wherein the first recess is defined along a centerline of the first side and the second recess is defined along a centerline of the second side.

* * * * *